United States Patent [19]

Sebillotte

[11] Patent Number: 4,620,643

[45] Date of Patent: Nov. 4, 1986

[54] SAFETY DEVICE FOR OPENING AND CLOSING A PRESSURE-COOKING APPLIANCE WITHOUT DANGER

[75] Inventor: Christian Sebillotte, Selongey, France

[73] Assignee: SEB S.A., Selongey, France

[21] Appl. No.: 800,635

[22] PCT Filed: Feb. 15, 1985

[86] PCT No.: PCT/FR85/00027

§ 371 Date: Oct. 29, 1985

§ 102(e) Date: Oct. 29, 1985

[87] PCT Pub. No.: WO85/03851

PCT Pub. Date: Sep. 12, 1985

[30] Foreign Application Priority Data

Feb. 29, 1984 [FR] France .............................. 84 03153

[51] Int. Cl.$^4$ ............................................. B65D 45/00
[52] U.S. Cl. .................................................... 220/316
[58] Field of Search ................. 220/203, 216, 208, 209

[56] References Cited

U.S. PATENT DOCUMENTS 2,566,008  8/1951  Westby .
4,103,801  8/1978  Walker ............................... 220/203
4,512,495  4/1985  Bauer et al. ......................... 220/316
4,541,543  9/1985  Elexpuru ............................. 220/316

FOREIGN PATENT DOCUMENTS 2511845  9/1976  Fed. Rep. of Germany .
3223142  12/1983  Fed. Rep. of Germany .
2055207  5/1971  France .
2484817  12/1981  France .

Primary Examiner—George T. Hall
Attorney, Agent, or Firm—Young & Thompson

[57] ABSTRACT

The safety device is for a pressure-cooking appliance comprising a pressure vessel (1) on which is mounted a lid (2) provided with an opening (8) which communicates with the interior of the vessel (1) and in which are mounted a valve and valve stem (9) for closing the opening when the pressure within the vessel attains a predetermined value. The lid handle (5) and the vessel handle (6) comprise a thumb-actuated locking device (11, 15, 16, 18, 20) which cooperates with the valve stem (9) of the lid for preventing closure of the valve as long as the two handles (5, 6) are not in the closed position and for preventing opening of the lid (2) when the two handles are in the locked position as long as the valve is in the closed position.

6 Claims, 7 Drawing Figures

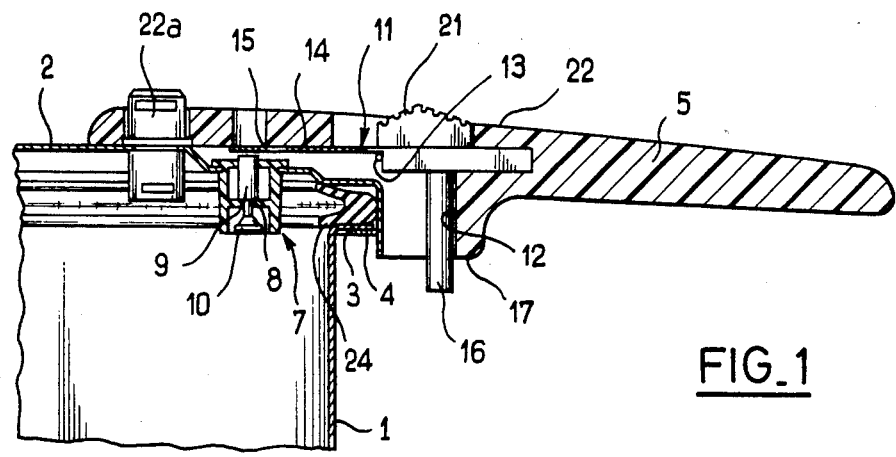
FIG_1
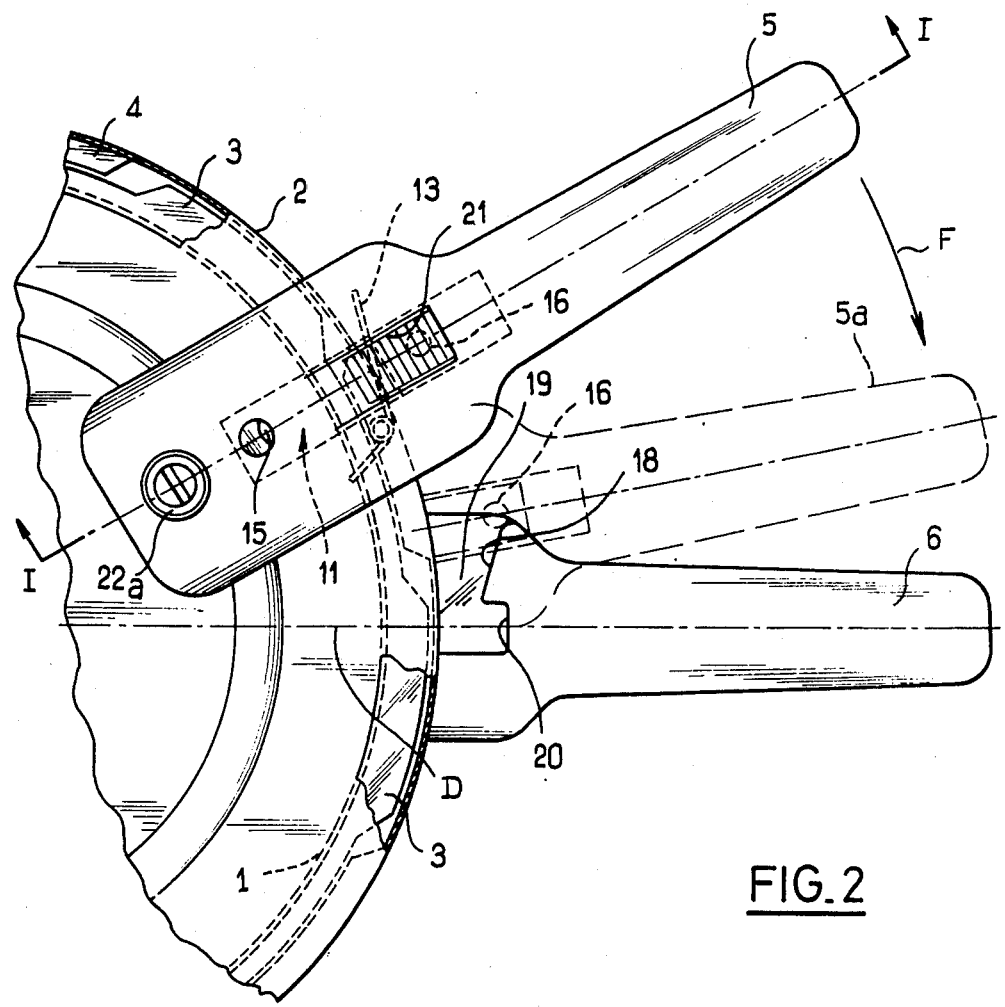
FIG_2

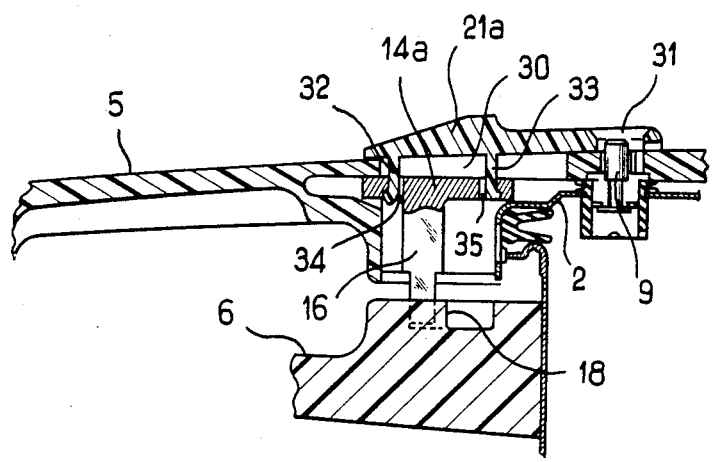
FIG_7

SAFETY DEVICE FOR OPENING AND CLOSING A PRESSURE-COOKING APPLIANCE WITHOUT DANGER

The present invention relates to a safety device for closing and opening a pressure cooker, such as an autocooker.

This device is applicable to pressure-cooking appliances comprising a vessel on which is mounted a lid, the rim of the lid and the rim of the vessel being provided with locking ramps which are intended to engage beneath each other by rotation of the lid on the pressure vessel. This closure system is commonly referred to as a bayonet locking system.

The lid and the pressure vessel are each fitted with a handle. In order to lock the lid in position, the lid handle is rotated until it comes into position directly above the vessel handle.

At the end of the cooking operation, it is absolutely necessary for the user to produce a pressure drop within the appliance before opening the lid. If this requirement is not met, any abrupt escape of steam from the pressure cooker might produce serious burns.

Accordingly, pressure cookers of known types are usually provided with a relief valve which the user must either remove or place in the steam exhaust position.

However, there is always a possibility that the user may forget to perform this operation.

In consequence, it is highly desirable to produce a safety device which prevents the user from opening the lid as long as the appliance still remains under pressure.

In certain types of cooking appliances such as the pressure cooker described in French Pat. No. 2,484,817 granted to the present Applicant, the lid has an orifice which communicates with the interior of the pressure vessel and in which is mounted a rod fitted with a valve for the purpose of closing said orifice when the pressure within the vessel attains a predetermined value.

In the French patent cited in the foregoing, there was described a pressure-cooking appliance comprising a vessel on which is mounted a lid, the rim of said lid and the rim of the pressure vessel being provided with ramps so arranged as to engage one beneath the other and to lock the lid on the pressure vessel by rotational displacement. Said lid and said vessel are each provided with a handle. The lid is provided with an opening which communicates with the interior of the pressure vessel and in which is mounted a stem fitted with a valve for the purpose of closing said opening when the pressure within the vessel attains a predetermined value.

This cooking appliance is equipped in addition with a safety device comprising associated means for cooperating with the lid-valve stem in order to prevent closure of the valve as long as the two handles are not in the closed position and in order to prevent opening of the lid when the two handles are in the locking position, that is to say as long as the valve is in the closed position.

The means referred-to in the foregoing comprise a stud movably mounted within a handle and adapted to cooperate with the end of one of the ramps for locking the rim of the vessel in order to prevent opening of the lid. Said stud is rigidly fixed to a lug provided with an opening located opposite to the valve when the stud is in the locking position, with the result that the valve is capable of engaging in said opening when the appliance is under pressure, thus preventing any displacement of the lug and of the stud.

Said device provides users with an appreciable degree of safety but is attended by the following drawbacks:

This device makes it necessary to modify one of the locking ramps of the vessel in order to form a notch in the end portion of the ramp for the purpose of ensuring effective locking of the stud. This additional operation complicates the manufacture of the vessel and has the effect of reducing the strength of the locking ramp. Furthermore, this ramp has a thin edge and a level stage of relatively substantial length which is applied against the stud at the time of opening and closing of the lid, thus resulting in rapid and irreparable wear of these two parts.

In addition, the control button which produces the displacement of the stud with respect to the locking ramp is associated with a complicated counter-motion system requiring a number of restoring springs.

The object of the present invention is to overcome the drawbacks of the structure described in the foregoing by producing a device which combines the advantages of greater simplicity and reliability while requiring no modification of the locking ramps of the pressure vessel and of the lid.

The safety device in accordance with the invention is applicable to a pressure-cooking appliance comprising a pressure vessel on which is mountd a lid, the rim of said lid and the rim of said vessel being provided with guide ramps which are intended to engage one beneath the other and to lock the lid in position on the vessel by rotational displacement, said lid and said vessel being each provided with a handle. The lid is provided with an opening which communicates with the interior of the pressure vessel and in which is mounted a stem fitted with a valve head having the function of closing said opening when the pressure within the vessel attains a predetermined value. The safety device comprises associated means which cooperate with the stem of the lid valve in order to prevent closure of the valve as long as the two handles are not in the closed position and in order to prevent opening of the lid when the two handles are in the locking position as long as the valve is in the closed position.

In accordance with the invention, the distinctive feature of said device lies in the fact that the associated means aforesaid comprise a locking member slidably mounted in the handle and adapted to carry a push-rod, said locking member being constituted by a portion which extends to a point located above the valve stem and which is provided with a hole, that a locking ramp formed on the pressure vessel handle is adapted to cooperate with the push-rod of the locking member in order to thrust said push-rod into a position such that the valve stem is permitted to engage in the hole of said locking member extension when the two handles are in the fully closed position and locked together by the push-rod of the locking member.

By displacing the two handles to the locking position, the ramp of the pressure vessel handle is applied against the push-rod of the locking member and thrusts this latter into a position such that the hole of the locking member is located opposite to the valve stem. When the pressure rises within the cooking appliance, the valve stem engages within said hole. The locking member is thus locked in position by the valve stem. At the same time, said locking member prevents any unlocking of the two handles, with the result that the user cannot open the lid as long as the valve is engaged in the hole of the locking member and as long as the pressure within the vessel exceeds a predetermined value.

The locking ramp formed in the handle which controls the displacement of the locking member avoids any need to modify the ramps formed on the pressure vessel rim, which would complicate the manufacture of the vessel. Furthermore, the handle ramp eliminates any wear of the pressure vessel ramp and of the locking member which bears on this latter in the known design.

In the case of the present invention, the problems presented by wear of the locking ramp and of the push-rod are avoided by virtue of the fact that the material of the handle has a low coefficient of friction with the push-rod. Another noteworthy feature lies in the fact that the handle is readily exchangeable in the event of wear. Furthermore, the handle ramp can be set at an optimum angle in order to ensure progressive and smooth displacement of the push-rod. This is not the case with the known design since the profile of the pressure vessel ramps is dictated by production requirements.

Other features and advantages of the invention will be more apparent from the following description.

In the accompanying drawings given by way of non-limiting example:

FIG. 1 is a fragmentary longitudinal sectional view taken along the plane I—I of FIG. 2 and showing a pressure cooker equipped with a safety device in accordance with the invention;

FIG. 2 is a top view of the pressure cooker, the handles of which are not locked in position;

FIG. 7 is a sectional view of the device in which provision is made for a removable thumb-control button.

Figure 3:
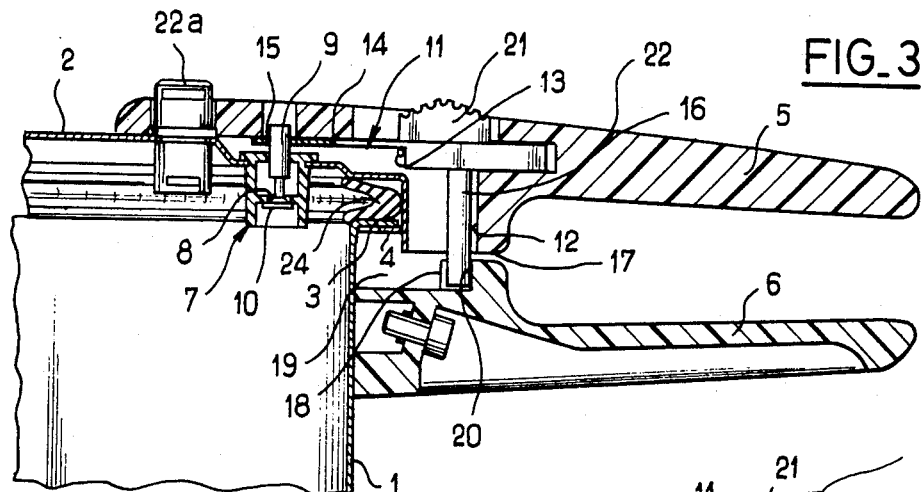
FIG. 3 is a view which is similar to FIG. 1, the two handles being locked in position and the valve being located in the closed position.

In the embodiment of FIGS. 1 to 6, there is shown a pressure cooker comprising a vessel 1 on which is mounted a lid 2. The rim of the pressure vessel 1 is provided with locking ramps 3 which, in the locking position of the lid 2, engage on locking ramps 4 formed on the rim of the lid 2 (as shown in particular in FIGS. 3 and 4).

A handle 5 is attached to the lid 2 and a handle 6 is attached to the side wall of the pressure vessel 1. Closure of the lid 2 is effected by rotating this latter in the direction of the arrow F as indicated in FIG. 2 up to the position shown in FIGS. 3 and 4 in which the two handles 5 and 6 are located one above the other and the locking ramps 4 of the lid 2 are engaged beneath the locking ramps 3 of the rim of the pressure vessel 1.

The lid 2 is fitted with a relief valve 7 having an opening 8 or valve port which communicates with the interior of the pressure vessesl 1. Within said valve port 8 is mounted a vertical stem 9 fitted with a so-called "flow-limiting" valve head 10, the function of which is to close said port 8 when the pressure within the vessel 1 attains a value of approximately 40 mbar.

A locking member 11 is slidably mounted within the handle 5 of the lid 2 and, in the position shown in FIGS. 1 and 2, is applied against a bearing surface 12 of the handle 5 under the action of a restoring spring 13.

Said locking member 11 comprises a rigid blade 14 which extends horizontally above the stem 9 of the valve head 10 and which is provided with a hole 15. That end of said blade 14 which is remote from the hole 15 is adapted to carry a vertical push-rod 16 which projects beneath the bottom face 17 of the handle 5.

As shown in FIG. 2, a locking ramp 18 is formed in a hollowed-out portion 19 of the handle 6 of the pressure vessel 1. Said hollowed-out portion 19 is formed in the lateral face of said handle which is directed towards the handle 5 of the lid 2. Said locking ramp 18 is located in a plane at right angles to a diametral plane of the pressure vessel 1 (namely the plane of FIG. 2). Said locking ramp 18 makes an obtuse angle with a direction which passes through the diameter D of the vessel 1.

Figure 4:
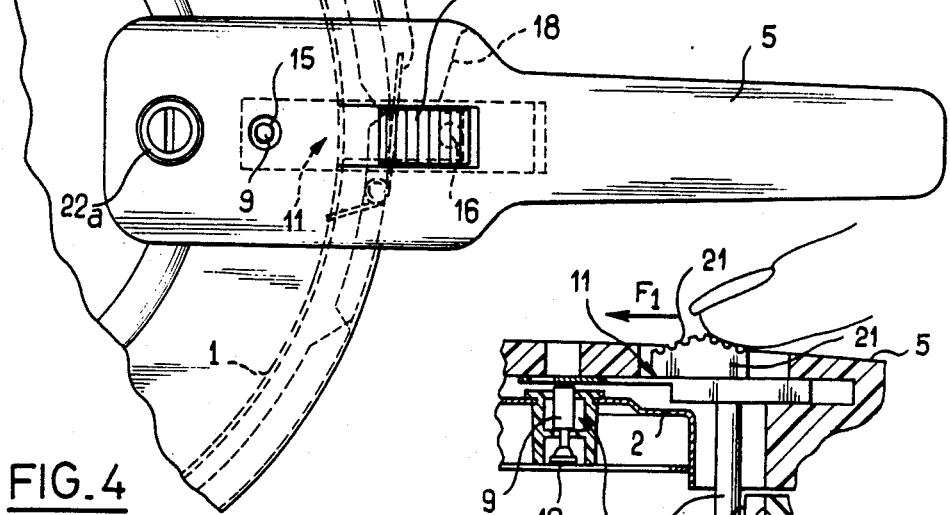
FIG. 4 is a top view of the appliance in the same position as that of FIG. 3.

Furthermore, said locking ramp 18 is adapted to cooperate with the push-rod 16 of the locking member 11 so as to thrust said member into a position such that the stem 9 of the valve head 10 is permitted to engage in the hole 15 of the blade 14 of the locking member 11 when the two handles 5, 6 are in the fully closed position as indicated in FIGS. 3 and 4 and when the interior of the vessel 1 is at a pressure exceeding 40 mbar.

The hollowed-out portion 19 is provided with a recess 20 at the end of the locking ramp 18 remote from the lateral face of the handle 6 which is directed towards the other handle 5. The push-rod 16 of the locking member engages and locks within said recess 20 when the two handles 5 and 6 are in the fully locked position as indicated in FIGS. 3 and 4.

In this position, the two handles 5 and 6 are completely locked together by means of the push-rod 16 which is retained within the locking recess 20.

The locking member 11 further comprises a thumb control button 21 which projects from the top face 22 of the lid handle 5 (as shown in FIGS. 1 and 3). Said thumb control button 21 is formed in one piece with the locking member 11 and the push-rod 16. Said control button 21 is very readily accessible and enables the user to move the locking member 11 in the forward direction (as shown by the arrow $F_1$ of FIG. 6) when the stem 9 of the relief valve 7 is withdrawn from the hole 15 of the locking member 11.

Said valve stem 9 is mounted within the lid 2 with a predetermined lateral clearance so as to ensure that, when it is engaged in the hole 15 of the locking member 11, a thrust exerted on said locking member 11 against the valve stem 9 (as indicated by the arrow $F_2$ of FIG. 5) is capable of tilting said valve stem 9 and thus producing a leakage flow of steam between the valve head 10 and the port 8 of the relief valve 7.

The operation of the safety device described in the foregoing will now be explained.

In order to close the lid 2, the lid handle 5 is rotated in the direction of the arrow F of FIG. 2, namely towards the handle 6 which is attached to the pressure vessel 1.

During this rotational displacement, the locking ramps 4 of the lid 2 engage beneath the locking ramps 3 of the pressure vessel 1.

As long as the handle 5 of the lid 2 has not reached the fully closed position (see position 5a in FIG. 2), the blade 14 of the locking member 11 prevents any upward displacement of the stem 9 of the valve head 10, with the result that a leakage flow takes place through the port 8 of the relief valve 7 which prevents any pressure rise within the vessel 1.

When the handle 5 of the lid is displaced towards the completely closed position shown in FIGS. 3 and 4, the push-rod 16 of the locking member 11 engages on the ramp 18 of the handle 6. Said push-rod 16 then thrusts back the locking member 11 while compressing the restoring spring 13 until said push-rod 16 engages in the locking recess 20 formed at the end of the ramp 18, thus interlocking the two handles 5 and 6. The catch engagement of the push-rod 16 within the locking recess 20 produces an audible click which warns the user that the appliance is correctly locked.

In this position, the hole 15 of the locking member 11 is placed opposite to the stem 9 of the relief valve 7. When the pressure rises within the vessel 1, the valve stem 9 engages within the hole 15 of the locking member 11 and thus prevents any displacement of said locking member 11 and of the push-rod 16 which is engaged within the locking recess 20. Thus the two handles 5 and 6 cannot be unlocked as long as the appliance remains under pressure.

Opening of the lid 2 is possible only when the internal pressure of the vessel 1 is lower than the predetermined pressure, thus permitting a downward displacement of the valve stem 9 and withdrawal of this latter from the hole 15 formed in the locking member 11.

In order to relieve the pressure within the appliance, the user may either remove the main valve 22a or place it in the steam exhaust position.

Figure 5:
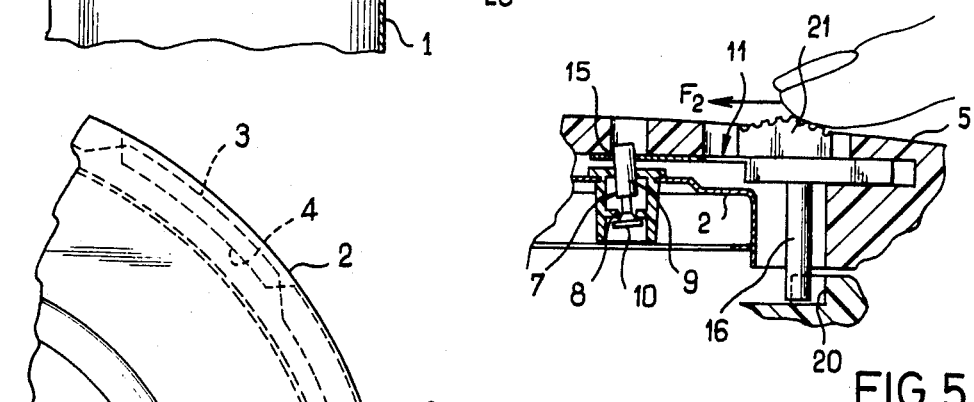
FIG. 5 is a fragmentary longitudinal sectional view of the safety device, showing how the user can produce a steam leakage flow from the relief valve prior to unlocking of the handles.

The user may also initiate slow decompression of the appliance by displacing the thumb-actuated control button 21 of the locking member 11 in the direction of the arrow F$_2$ (as shown in FIG. 5), thus producing a forward tilt of the valve stem 9 and a leakage flow between the valve head 10 and the valve port 8.

Figure 6:
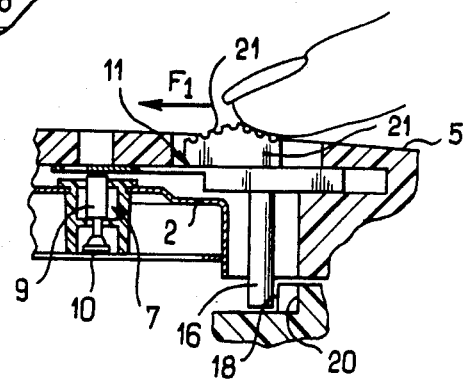
FIG. 6 is a view which is similar to FIG. 5 and shows how the user can unlock the handles.

When the valve stem 9 has withdrawn from the hole 15 of the locking member 11, the appliance can then be opened simply by displacing the thumb-actuated control button 21 in the direction of the arrow F$_1$ as shown in FIG. 6 in order to free the push-rod 16 from the locking recess 20. The handle 5 can then be rotated in a direction opposite to the arrow F of FIG. 2 in order to disengage the locking ramps 3 and 4 of the pressure vessel 1 and of the lid 2.

In consequence, the device in accordance with the invention prevents any pressurization of the appliance as long as the handles 5 and 6 are not locked in position and also prevents any possible opening of the appliance as long as this latter remains under pressure.

As will readily be apparent, the invention is not limited to the examples described in the foregoing and any number of modifications may accordingly be contemplated without thereby departing either from the scope or the spirit of the invention.

Thus in the case of the embodiment illustrated in FIG. 7, the thumb control button 21a is removably fixed on the rigid blade 14a which is connected to the push-rod 16. Said control button 21a covers a hollowed-out portion 30 formed in the handle 5. The thumb control button 21a is provided with two flexible lugs 32, 33 which are adapted to engage and lock within openings 34, 35 formed in the rigid blade 14a. Moreover, the thumb control button 21a extends to a point located directly above the valve stem 9. This extension is provided with an opening 31 which is located opposite to the valve stem 9 and in which this latter is capable of engaging when the appliance is under pressure, thus preventing any displacement of the control button 21a and consequently preventing any opening of the lid 2.

The possibility of detachment of the thumb control button 21a permits cleaning and removal of any dirt and foreign matter which may have infiltrated beneath the button.

I claim:

1. A safety device for opening and closing a pressure-cooking appliance comprising a pressure vessel (1) on which is mounted a lid (2), the rim of said lid and the rim of said vessel being provided with locking ramps (3, 4) which are intended to engage one beneath the other and to lock the lid in position on the vessel by rotational displacement, said lid (2) and said vessel (1) being each provided with a handle (5, 6), the lid being provided with an opening (8) which communicates with the interior of the pressure vessel (1) and in which is mounted a stem (9) fitted with a valve head having the function of closing said opening when the pressure within the vessel (1) attains a predetermined value, said device comprising associated means adapted to cooperate with the stem (9) of the valve (10) of the lid (2) in order to prevent closure of the valve (10) as long as the two handles (5, 6) are not in the closed position and in order to prevent opening of the lid (2) when the two handles (5, 6) are in the locking position as long as the valve (10) is in the closed position, wherein said associated means comprise a locking member (11) slidably mounted in the handle (5) and adapted to carry a push-rod (16), said locking member (11) being constituted by a portion (14) which extends to a point located above the valve stem (9) and which is provided with a hole (15), wherein a locking ramp (18) formed on the pressure vessel handle (6) is adapted to cooperate with the push-rod (16) of the locking member in order to thrust said push-rod into a position such that the valve stem (9) is permitted to engage in the hole (15) of said locking member extension (14) when the two handles (5, 6) are in the fully closed position and locked together by the push-rod (16) of said locking member (11).

2. A device according to claim 1, wherein the locking member (11) is a rigid blade (14) slidably mounted in opposition to the action of a spring (13) and the push-rod (16) projects beneath the bottom face (17) of the lid handle (5), wherein the locking ramp (18) of the vessel handle (6) is formed in a hollowed-out portion (19) of the lateral handle face which is directed towards the other handle (5), said locking ramp (18) being located in a plane which is perpendicular to a diametral plane of the pressure vessel (1) and makes an obtuse angle with a diametral direction (D) of said vessel (1).

3. A device according to claim 2, wherein the hollowed-out portion (19) is provided with a locking recess (20) at the end of the ramp (18) remote from the lateral face of the lid handle, the function of said locking recess being to house the push-rod (16) of the locking member (11) when the two handles are in the fully locked position.

4. A device according to claim 1, wherein the locking member (11) is adapted to carry a readily accessible thumb-actuated control button (21) for disengaging the push-rod (16) from the locking recess (20).

5. A device according to claim 1, wherein the valve stem (9) is mounted in the lid (2) with a predetermined lateral clearance in order to ensure that when said valve stem is engaged in the hole (15) of the locking member (11), a thrust exerted on said locking member against the valve stem can move said stem to an inclined position without having the effect of unlocking the handles.

6. A device according to claim 4, wherein the thumb-actuated control button (21*a*) is removably fixed on the rigid blade (14*a*) which is attached to the push-rod (16), said control button (21*a*) being adapted to cover a hollowed-out portion (30) formed in the handle (5).

* * * * *